United States Patent [19]

Rosenbaum

[11] 4,273,369
[45] Jun. 16, 1981

[54] REVERSIBLE PUSH BLOCK-REAR BUMPER ASSEMBLY

[75] Inventor: Glen F. Rosenbaum, Elk Point, S. Dak.

[73] Assignee: CMI Corporation, Oklahoma City, Okla.

[21] Appl. No.: 63,959

[22] Filed: Aug. 6, 1979

[51] Int. Cl.³ ............................................. B60R 19/00
[52] U.S. Cl. ........................................ 293/1; 293/24; 293/116; 293/118; 293/DIG. 1; 280/481
[58] Field of Search ...................... 280/481; 293/24, 1, 293/21, 116, 118, DIG. 1

[56] References Cited

U.S. PATENT DOCUMENTS

| | | | |
|---|---|---|---|
| 2,247,664 | 7/1941 | Osman | 280/481 |
| 2,990,212 | 6/1961 | Nicastro | 293/34 |
| 3,210,110 | 10/1965 | Chieger | 293/118 |
| 3,370,878 | 2/1968 | Carr | 293/118 |
| 3,537,727 | 11/1970 | Tantlinger | 280/415 B |
| 3,836,180 | 9/1974 | Kenjo | 280/481 |
| 3,905,629 | 9/1975 | Kwong | 293/24 |
| 3,906,613 | 9/1975 | Chappell | 280/481 |
| 3,934,912 | 1/1976 | Ogihara | 293/119 |
| 3,992,047 | 11/1976 | Barenyi | 293/24 |

Primary Examiner—Robert R. Song
Attorney, Agent, or Firm—Dunlap, Codding & McCarthy

[57] ABSTRACT

A reversible push block-rear bumper assembly for attachment to a motor vehicle is provided in which a support unit having a forwardly inclined downwardly extending surface is secured to the underside of a vehicle in close proximity to the rear end of the vehicle. A block unit having an upper incline surface which can be mated with the forwardly incline downwardly extending surface of the support unit is also provided, such surfaces being adapted so that when the block unit and support unit are secured together, the block unit will either extend downwardly from the support unit in a plane substantially perpendicular to the longitudinal plane of the vehicle and thus function as a bumper or, upon rotating the block unit 180° into a reverse position, the block unit will extend outwardly from the rear end portion of the vehicle for use as a push block. An extension unit for modifying the length as well, as the angular relationship of the block unit to the support means, is also provided. In addition, an improved pintle hook assembly for attachment to the support unit is set forth.

5 Claims, 9 Drawing Figures

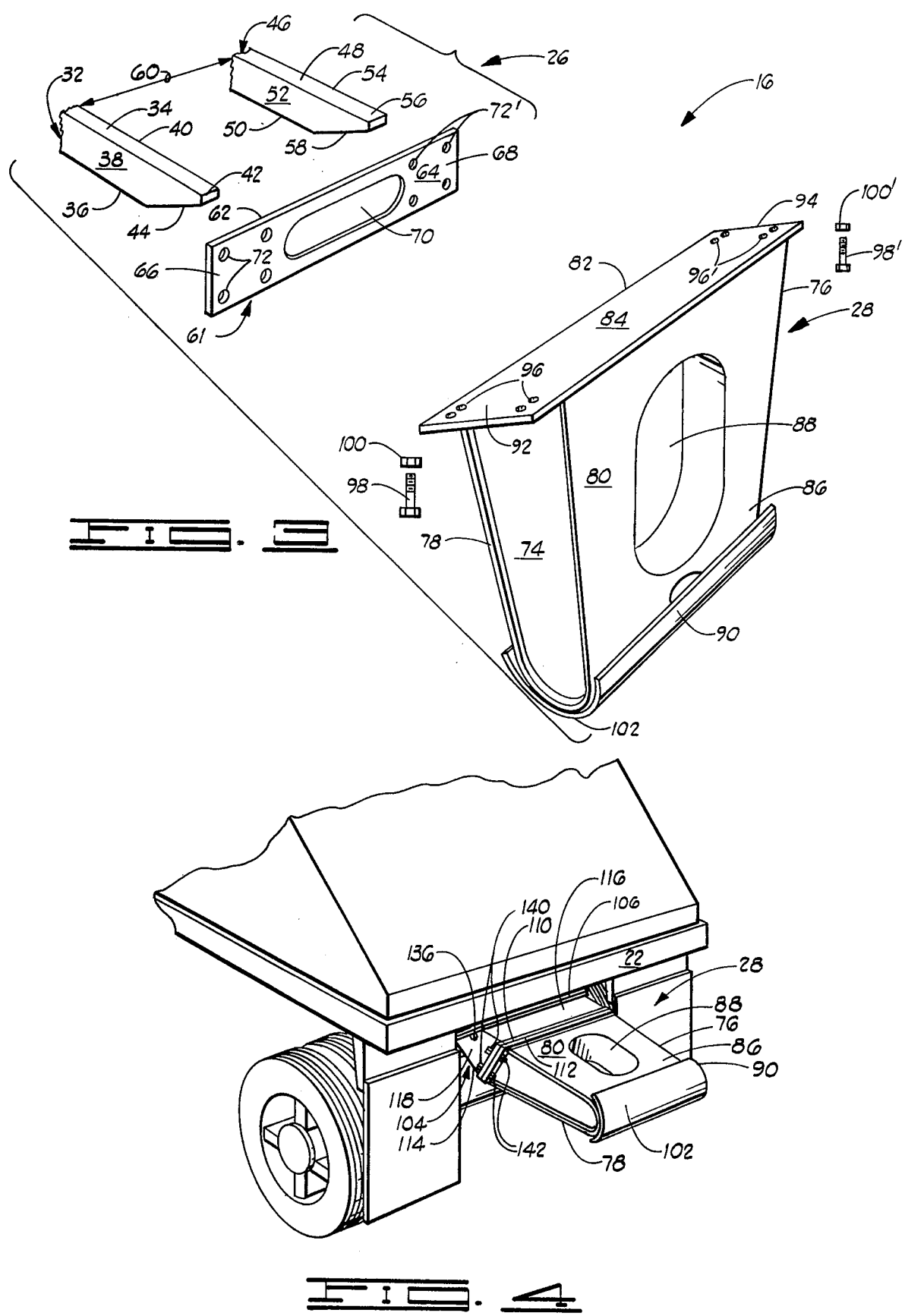

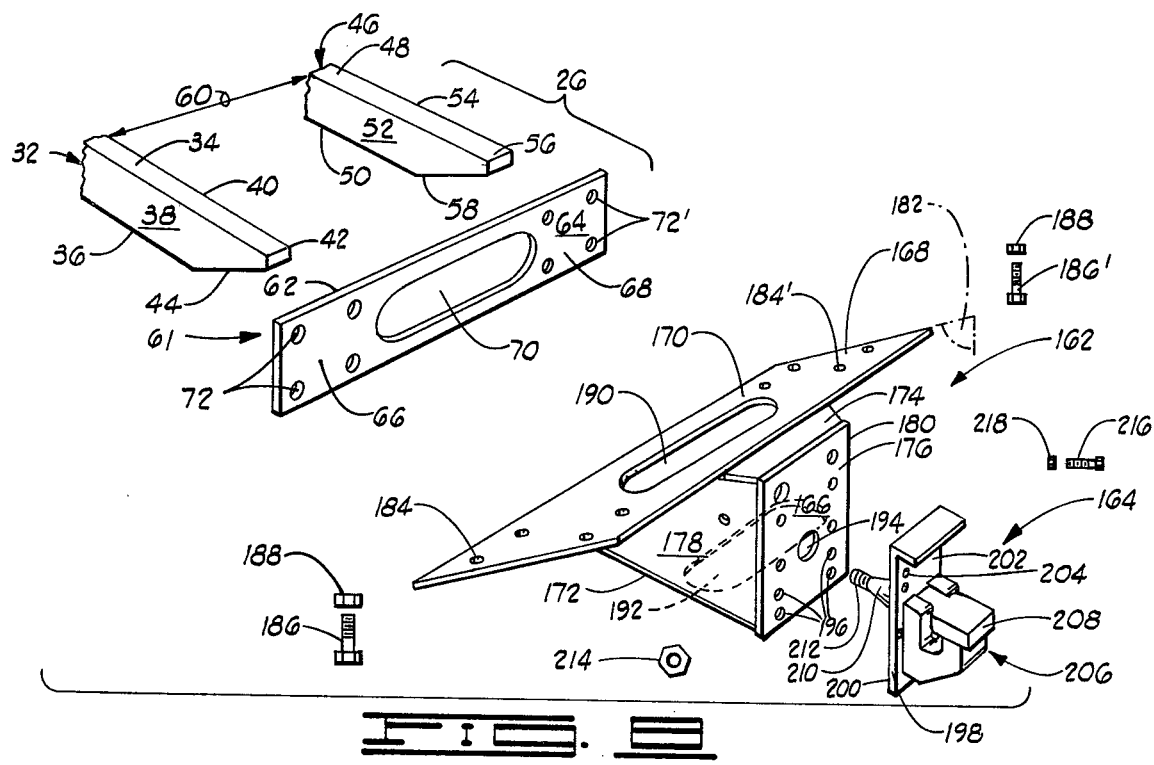
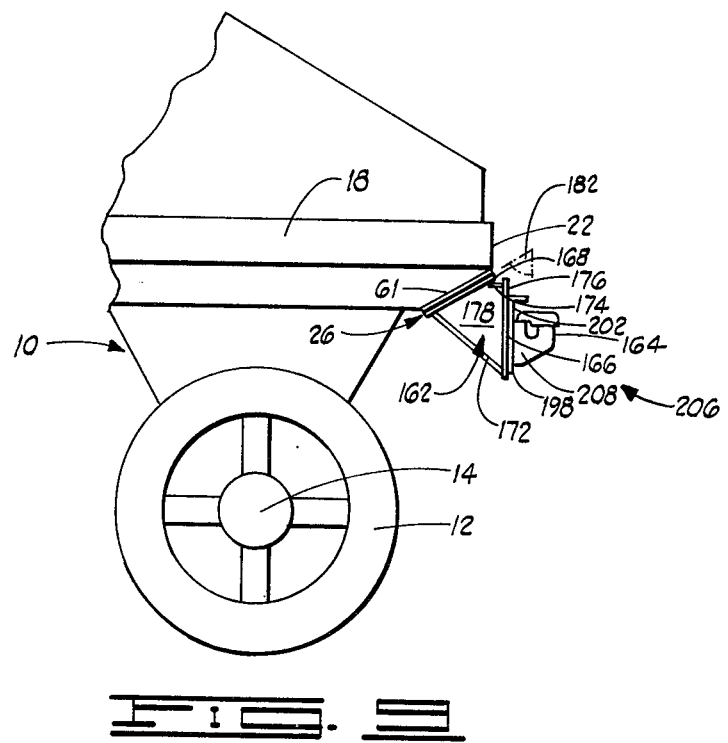

REVERSIBLE PUSH BLOCK-REAR BUMPER ASSEMBLY

BACKGROUND OF THE INVENTION

1. Field of the Invention

This invention relates to vehicle accessories, and more particularly to an improved push block-rear bumper assembly for wheeled vehicles. In one aspect it relates to a reversible push block-rear bumper assembly useful as a push block or rear bumper for a wheeled vehicle. In yet another aspect, the invention relates to an improved pintle hook assembly for attachment to the rear end portion of a wheeled vehicle.

2. Description of the Prior Art

A push block is a feature frequently provided on trailers as a contact point for pushing the trailer out of a position in which it has become stuck. Several problems have arisen with the conventional block which permanently projects from the rear of the trailer. First, governmental restrictions on overhanging loads and on overall trailer lengths have made it more difficult to carry a conventional projecting push block during ordinary highway operation. Second, because overseas shipping rates for trailers are based on the volume occupied by the trailer, the projecting push block makes an undue contribution to the trailers freight cost. Finally, the projecting push block hampers connection of two trailers and/or a helper dolly to form a train.

Numerous types of bumpers have likewise been employed by trucks and trailers. Such bumpers are generally of extremely heavy construction and must be capable of absorbing heavy shock loads due to the relatively large inertia of such vehicles. However, problems have been encountered in the fabrication and attachment of bumpers to the rear portions of such trucks and trailers in that the bumper must be designed to not unduly increase the weight of the vehicle and thus reduce the payload which the vehicle can carry; while, at the same time, the bumper should be capable of being positioned so as to not substantially increase the length of the vehicle. Many of the prior art devices, in order to overcome such problems, have suggested the use of pivoted bumper units which can be swung into or out of position depending upon the desires of the operator of the vehicle. However, such pivotably attached bumper units generally either do not provide the desired rigidity or cannot absorb the relatively heavy impact loads which such bumpers often encounter. In addition, such prior art bumpers often extend rearwardly from the vehicle thus increasing its overall length.

Therefore, an object of the invention is to provide an improved push block-rear bumper assembly which does not suffer from the disadvantages hereinbefore set forth.

Another object of the invention is to provide an improved push block-rear bumper combination assembly which can be employed as a bumper without increasing the overall length of the vehicle; or can be, when desired, placed in a projected position for use as a push block.

Another object of the invention is to provide an improved pintle hook assembly for attachment to the rear end portion of a vehicle.

These and other objects, advantages, and features of the present invention will become apparent to those skilled in the art from a reading of the following detailed description when read in conjunction with the accompanying drawings which illustrate the invention.

BRIEF DESCRIPTION OF THE DRAWINGS

FIG. 3 is an enlarged, exploded, perspective view of the push block-rear bumper assembly of the present invention.

FIG. 4 is a perspective view of the push block-rear bumper assembly in combination with an extension unit for modifying the length and the angular disposition of the push block.

FIG. 6 is a perspective view of the extension unit of FIG. 5.

FIG. 8 is an enlarged, exploded, perspective view of the pintle hook assembly of FIG. 7.

FIG. 9 is a side elevation of the pintle hook assembly secured to the frame of a trailer.

DETAILED DESCRIPTION OF THE DRAWINGS

Figure 1:
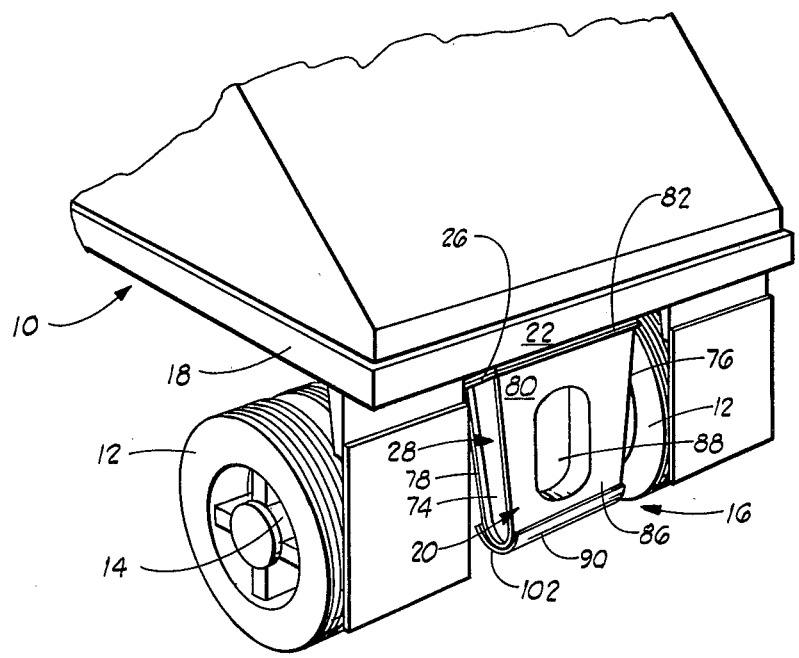
FIG. 1 is a perspective view of the push block-rear bumper assembly of the present invention attached to the rear end portion of a trailer in which the assembly is employed as a bumper.
Figure 2:
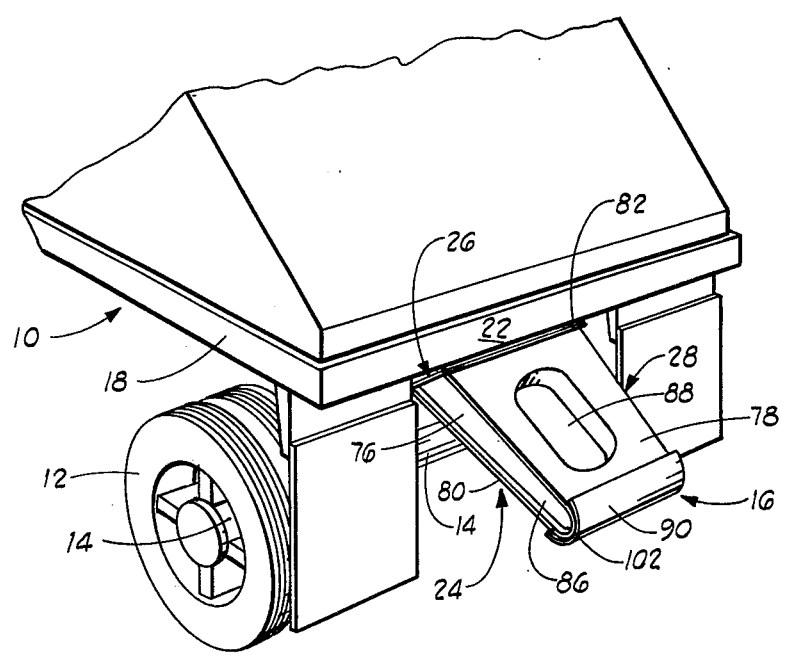
FIG. 2 is a perspective view of the push block-rear bumper assembly of the present invention secured to the rear end portion of a trailer in which the assembly is employed as a push block.

Referring now to the drawings wherein like and/or similar parts and elements will be designated by the same numeral, and particularly to FIGS. 1 and 2, a vehicle 10, such as a truck or trailer, includes a frame (not shown) mounted on a plurality of wheels, such as rear wheels 12, by axles, such as rear axle 14, and the axles are secured to the frame of vehicle 10 by means well known in the art. Push block-rear bumper assembly 16 is secured to the rearward end 18 of vehicle 10 at a position substantially intermediate and rearward of the wheels 12 so that the push block-rear bumper assembly 16, when employed as a rear bumper 20 for the vehicle 10, as depicted in FIG. 1, extends downwardly from the frame of the vehicle 10 and the rearward surface of the rear bumper 20 is substantially aligned with the rearward surface 22 of the rearward end 18 of vehicle 10; whereas, when push block-rear bumper assembly 16 is employed as a push block 24 for vehicle 10, as depicted in FIG. 2, the push block-rear bumper assembly 16 is adjusted and repositioned so that the push block 24 projects rearwardly beyond the rearward surface 22 of the rearward end 18 of vehicle 10.

Referring now to FIG. 3, in combination with FIGS. 1 and 2, the push block-rear bumper assembly 16 includes a support assembly 26 and a block member 28. The support assembly 26 includes a first beam 32 having an upper side 34, a lower side 36, a first side 38, an opposed second side 40, a forward end (not shown), a rearward end 42 and a lower rearward end support surface 44; a second beam 46 having an upper side 48, a lower side 50, a first side 52, an opposed second side 54, a forward end (not shown), a rearward end 56, and a lower rearward end support surface 58; the second beam 46 being spaced a distance 60 from the first beam 32 and extending generally parallel to the disposition of the first beam 32; and, a support plate 61. Desirably, the first beam 32 and the second beam 46 form a part of the longitudinal frame or substructure of vehicle 10. The rearward ends 42 and 56 of the first beam 32 and the second beam 46 terminate at an equal distance from the rearward surface 22 of vehicle 10 so that when block member 28 is secured to the lower rearward end support surface 44 of the first beam 32 and the lower rearward end support surface 58 of the second beam 46 through support plate 61 for use as a rear bumper 20, the rearward surface 80 of the block member 28 will be substantially aligned with an imaginary vertical plane adjacent the rearward surface 22 of the rearward end 18 of the vehicle 10.

The lower rearward end support surface 44 of the rearward end 42 of the first beam 32 is forwardly inclined from the upper portion of the rearward end 42 of the first beam 32 to the lower side 36 of the first beam 32; and the lower rearward end support surface 58 of the rearward end 56 of the second beam 46 is likewise forwardly inclined from the upper portion of the rearward end 56 of the second beam 46 to the lower side 50 of the second beam 46. The degree of inclination of the lower rearward end support surface 44 of the first beam 32 and the lower rearward end support surface 58 of the second beam 46 can vary. However, the degree of inclination of both of the lower rearward end support surfaces 44 and 58 of the first and second beams 32 and 46 is substantially the same and the lower rearward end support surfaces 44 and 58 form an acute angle with the longitudinal axis of the first and the second beams 32 and 46.

The support plate 61 includes a first connecting surface 62, a second opposed support surface 64, a first end 66, a second opposed end 68 and an enlarged opening 70. The purpose of the enlarged opening 70 within the support plate 61 will be discussed hereinafter. The support plate 61 is of sufficient size so that when the first connecting surface 62 of the support plate 61 is positioned adjacent the lower rearward end support surfaces 44 and 58 of the first and the second beams 32 and 46, respectively, and the support plate 61 is thereafter secured to the first and second beams 32 and 46, by any suitable means such as welding, the first end 66 of the support plate 61 will extend outwardly from the first side 38 of the first beam 32, the second opposed end 68 of the support plate 61 will extend outwardly from the second opposed side 54 of the second beams 46, and the enlarged opening 70 in the support plate 61 will be disposed between the second opposed side 40 of the first beam 32 and the facing first side 52 of the second beam 46. Thus, when the support plate 61 is secured to the first and second beams 32 and 46 so that the first connecting surface 62 of the support plate 61 abuts the lower rearward end support surfaces 44 and 58 of the first and the second beams 32 and 46, the second opposed support surface 64 of the support plate 61 will be provided with a degree of inclination corresponding to the degree of inclination of the lower rearward end support surfaces 44 and 58 of the first and second beams 32 and 46.

The first end 66 of the support plate 61 which extends outwardly from the first side 38 of the first beam 32 and the second opposed end 68 which extends outwardly from the second side 54 of the second beam 46 are each provided with a plurality of apertures 72 and 72', respectively. The first end 66 and the second opposed end 68 of the support plate 61 serve as flanges for securing block member 28 thereto.

The block member 28 is provided with a first side 74, an opposed second side 76, a forward side 78, an opposed rearward side 80, an upper end 82 having an inclined surface 84, an opposed lower end 86, an enlarged opening 88, and a bumper plate 90. The upper end 82 of block member 28 is further characterized as having a first end portion 92 which extends outwardly from the first side 74 of the block member 28; and an opposed second end portion 94 which extends outwardly from the opposed second side 76 of the block member 28. The first end portion 92 and the opposed second end portion 94 of the block member 28 are provided with a plurality of apertures 96 and 96', respectively.

The degree of inclination of the inclined surface 84 of the upper end 82 of the block member 28 can vary widely and will be dependent to a large extent upon the degree of inclination of the second opposed support surface 64 of the support plate 61 and the desired angular disposition of the block member 28 since the inclined surface 84 of the upper end 82 of the block member 28 is mated with the second opposed support surface 64 of the support plate 61 when the block member 28 is secured to the support plate 61.

By providing the inclined surface 84 of the upper end 82 of the block member 28 with substantially the same degree of inclination as the second opposed support surface 64 of support plate 61, the block member 28 can be secured to the support plate 61 so that the block member 28 extends downwardly in a plane substantially perpendicular to the longitudinal axis of the first beam 32 and the second beam 46 (as shown in FIG. 1), and the opposed rearward side 80 of the block member 28 will be substantially aligned with the rearward surface 22 of the rearward end 18 of the vehicle 10; or the block member 28 can be rotated 180° so that the forward side 78 of the block member 28 can be viewed when looking at the rearward end 18 of the vehicle 10, as shown in FIG. 2, and the opposed lower end 86 of the block member 28 having bumper plate 90 secured thereto projects rearwardly beyond the rearward surface 22 of the rearward end 18 of the vehicle 10.

The securing of the block member 28 to support plate 61 is accomplished by abutting the inclined surface 84 of the upper end 82 of the block member 28 with the second opposed support surface 64 of the support plate 61, aligning the apertures 72 (within the first end 66 of the support plate 61) with the apertures 96 (in the first end portion 92 of the upper end 82 of the block member 28), and the apertures 72' (within the second opposed end 68 of the support plate 61) with the apertures 96' (in the second opposed end portion 94 of the upper end 82 of the block member 28), and positioning a bolt 98 into each of the aligned apertures 72 and 96 and a bolt 98' into each of the aligned apertures 72' and 96'. The bolts 98 and 98' are secured in place by nuts 100 and 100', respectively.

The enlarged opening 88 of the block member 28 serves to reduce the overall weight of the block member 28 to facilitate removal and reattachment of the block member 28 to the vehicle when it is desirable to change the use of the block member from that of a rear bumper 20 to that of a push block 24, or from that of a push block 24 to that of a rear bumper 20.

Bumper plate 90, depicted as having a generally curved outer surface 102, is fixably secured to the opposed lower end 86 of the block member 28. Bumper plate 90 thus provides an enlarged surface area for contact with a second vehicle's bumper when the block member 28 is in a rearwardly extended position for use as a push block as depicted in FIG. 2.

In some instances it may be desirable to alter the angular disposition or rearward extension length of the block member 28, when the block member 28 is in a rearwardly extended position for use as a push block. In such instances, the angular disposition of the block member 28 can be altered by positioning an extension member 104 (FIG. 5) between the second opposed support surface 64 of support plate 61 and the inclined surface 84 of the upper end 82 of the block member 28 and securing the extension member thereto.

Figure 5:
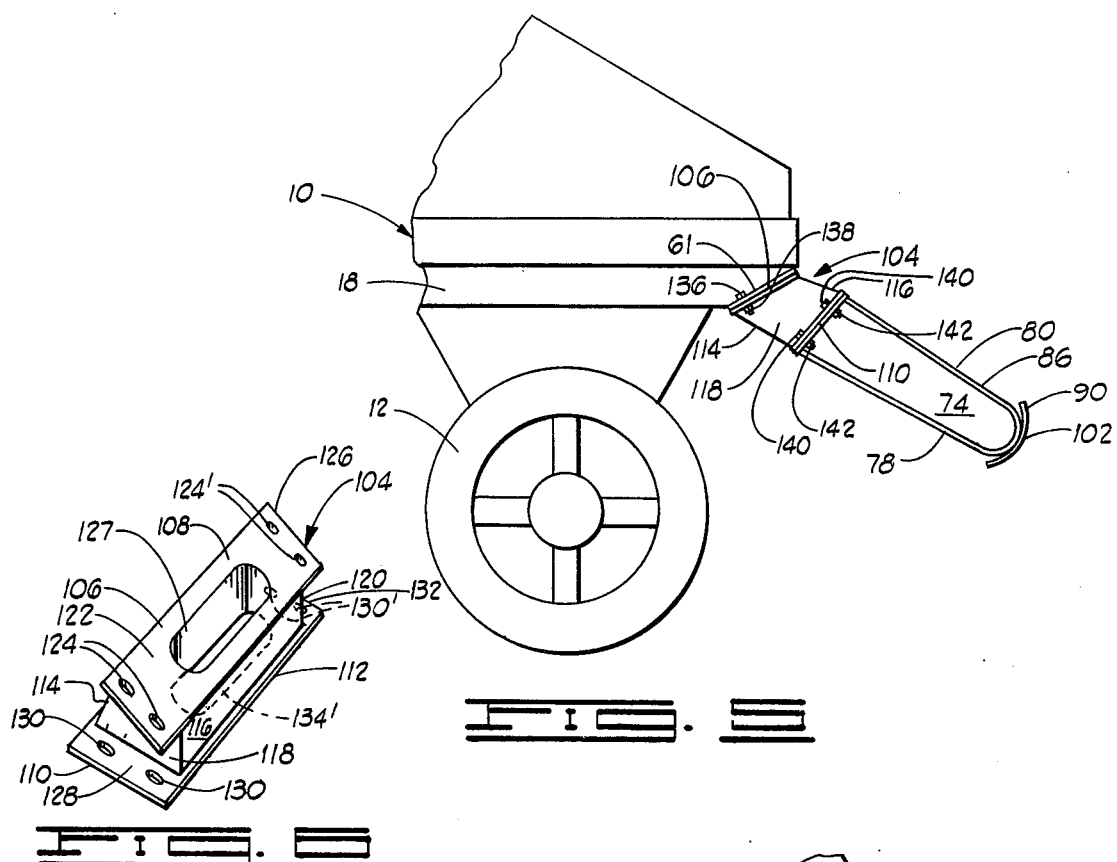
FIG. 5 is a side elevation of the extension unit and push block-rear bumper assembly secured to the frame structure of a vehicle.

Referring now to FIGS. 4, 5 and 6, extension member 104 is provided with an upper side 106 having an upper connecting surface 108, a lower opposed side 110 having a lower opposed support surface 112, a first side 114, a second opposed side 116, a first end 118 and a second opposed end 120. The upper side 106 is spaced a distance from the opposed lower side 110 in a non-parallel relation thereby providing the upper connecting surface 108 of the upper side 106 with a different degree of inclination than the lower support surface 112 of the lower opposed side 110. In order to obtain maximum strength with minimum weight, extension member 104 is desirably fabricated of a plurality of plates secured together, such as by welding, thereby providing extension member 104 with a hollow center.

The upper side 106 of the extension member 104 includes a first end portion 122 having a plurality of apertures 124 therein, an opposed second end portion 126 having a plurality of apertures 124' therein, and an enlarged opening 127 positioned intermediate the apertures 124 and 124' in the first and second end portions 122 and 126 thereof. The lower opposed side 110 is likewise provided with a first end portion 128 having a plurality of apertures 130 therein, an opposed second end portion 132 having a plurality of apertures 130' therein, and an enlarged opening 134 positioned intermediate the apertures 130 and 130' in the first and second end portions 128 and 132, respectively, the apertures 130' and the enlarged opening 134 being shown in phantom in FIG. 6.

The enlarged opening 127 and the apertures 124 and 124' in the upper side 106 of the extension member 104 are positioned therein so as to be alignable with the enlarged opening 70 and the apertures 72 and 72' of the support plate 61. Thus, extension member 104 can be secured to support plate 61 by abutting the upper connecting surface 108 of the upper side 106 of the extension member 104 with the second opposed support surface 64 of the support plate 61, aligning the apertures 124 and 124' of the upper side 106 of extension member 104 with the apertures 72 and 72' within the support plate 61 and securing bolts, such as by a plurality of bolts 136, in the aligned apertures 72 and 124 and 72' and 124' by nuts 138 (only one bolt 136 and nut 138 are shown in FIG. 5 to simplify the drawing). The alignment of the enlarged opening 127 of the upper side 106 of the extension member 104 with the enlarged opening 70 of support plate 61 allows one to more readily have access to the interior hollow portion of extension member 104 to thus facilitate connecting the block member 30 to the opposed lower side 110 of the extension member 104.

As previously stated, the lower opposed side 110 of the extension member 104 is also provided with an enlarged opening 134 and a plurality of apertures 130 and 130'. The apertures 130 and 130' in the lower opposed side 110 of the extension member 104 are positioned therein so as to be alignable with the apertures 96 and 96', respectively, in the first end portion 92 and the second opposed end portion 94 of the upper end 82 of the block member 28. Thus, the block member 28 can be secured to the extension member 104 by abutting the inclined surface 84 of the upper end 82 of the block member 28 with the lower opposed support surface 112 of the lower opposed side 110 of extension member 104, aligning the apertures 96 and 96' in the first end portion 92 and the second opposed end portion 94 of the upper end 82 of the block member 28 with the apertures 130 and 130', respectively, in the lower opposed side 110 of extension member 104 and securing bolts 140 in the aligned apertures by nuts 142.

As is evident from the configuration of the extension member 104, including the non-parallel relationship of the upper connecting surface 108 of upper side 106 with the lower opposed support surface 112 of lower opposed side 110, the attachment of the block member 28 to the support plate 61 through the extension member 104 alters the pitch or angular disposition of the block member 28 with respect to the support plate 61 and thus the inclined surface of the lower rearward end support surfaces 44 and 58 of the first beam 32 and the second beam 46.

Figure 7:
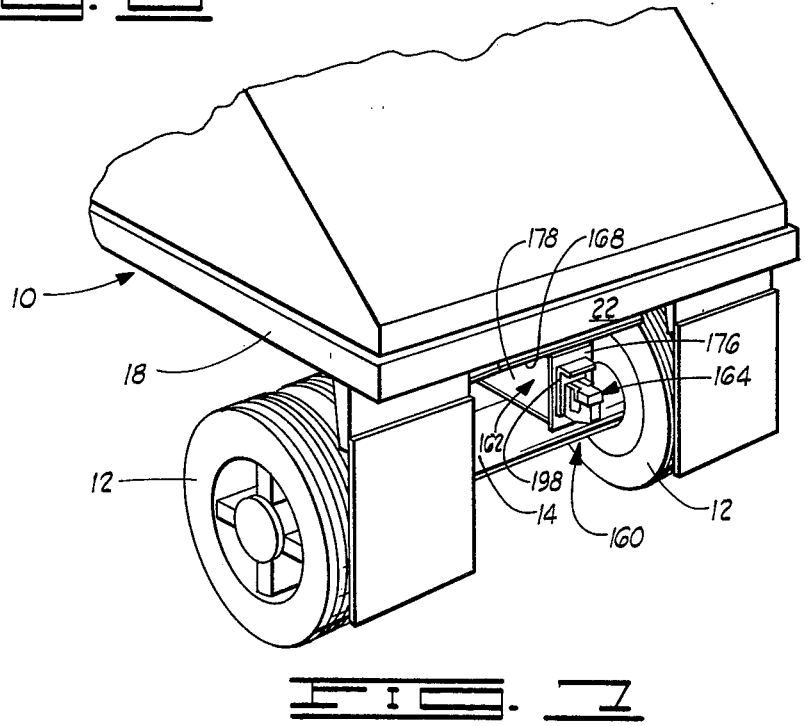
FIG. 7 is a perspective view of a trailer having the pintle hook assembly of the present invention attached thereto rearwardly of said trailer.

Referring now to FIG. 7, the vehicle 10, as described above, includes a frame (not shown) mounted on a plurality of wheels, such as rear wheels 12, by axles, such as rear axles 14, and the axles are secured to the frame of the vehicle 10 by means well known in the art. Pintle hook assembly 160 is secured to the rearward end 18 of vehicle 10 at a position substantially intermediate and rearward of the wheels 12. Details of the pintle hook assembly 160 will now be described with reference to FIGS. 8 and 9 in combination with FIG. 7.

The pintle hook assembly 160 includes the support assembly 26, a pintle hook support assembly 162 and pintle hook assembly 164. The support assembly 26 is the identical support assembly hereinbefore described with respect to the push block rear bumper assembly. As previously stated, the support assembly includes a first beam 32 having an upper side 34, a lower side 36, a first side 38, an opposed second side 40, a forward end (not shown), a rearward end 42 and a lower rearward end support surface 44; a second beam 46 having an upper side 48, a lower side 50, a first side 52, an opposed second side 54, a forward end (not shown), a rearward end 56 and a lower rearward end support surface 58, the second beam 46 being spaced a distance 60 from the first beam 32 and extending generally parallel to the disposition of the first beam 32; and a support plate 61. Desirably, the first beam 32 and the second beam 46 form a part of the frame or substructure of vehicle 10. The rearward ends 42 and 56 of the first beam 32 and the second beam 46 terminate at an equal distance from the rearward surface 72 of vehicle 10 so that when the pintle hook support assembly 162 is secured to the lower rearward end support surface 44 of the first beam 32 and the lower rearward end support surface 58 of the second beam 46 through the support plate 61, the rearward surface 166 of the pintle hook support assembly 162 will be disposed in a vertical plane rearward the rearward surface 22 of the rearward end 18 of the vehicle 10.

The lower rearward end support surface 44 of the rearward end 42 of the first beam 32 is forwardly inclined from the upper portion of the rearward end 42 of the first beam 32 to the lower side 36 of the first beam 32; and the lower rearward end support surface 58 of the rearward end 56 of the second beam 46 is likewise forwardly inclined from the upper portion of the rearward end 56 of the second beam 46 to the lower side 50 of the second beam 46. The degree of inclination of the lower rearward end support surface 44 of the first beam 32 and the lower rearward end support surface 58 of the second beam 46 can vary. However, the degree of inclination of both of the lower rearward end support surfaces 44 and 58 of the first and second beams 32 and 46 is substantially the same and the lower rearward end support surfaces 44 and 58 form an acute angle with the longitudinal axis of the first and the second beams 32 and 46.

The support plate 61 includes a first connecting surface 62, a second opposed support surface 64, a first end 66, a second opposed end 68 and an enlarged opening 70. The support plate 61 is of sufficient size so that when the first connecting surface 62 of the support plate 61 is positioned adjacent the lower rearward end support surface 44 and 58 of the first and the second beams 32 and 46, respectively, and the support plate 61 is thereafter secured to the first and second beams 32 and 46, by any suitable means such as welding, the first end 66 of the support plate 61 will extend outwardly from the first side 38 of the first beam 32, the second opposed end 68 of the support plate 61 will extend outwardly from the second opposed side 54 of the second beams 46, and the enlarged opening 70 in the support plate 61 will be disposed between the second opposed side 40 of the first beam 32 and the facing first side 52 of the second beam 46. Thus, when the support plate 61 is secured to the first and second beams 32 and 46 so that the first connecting surface 62 of the support plate 61 abuts the lower rearward end support surfaces 44 and 58 of the first and the second beams 32 and 46, the second opposed support surface 64 of the support plate 61 will be provided with a degree of inclination corresponding to the degree of inclination of the lower rearward end support surfaces 44 and 58 of the first and second beams 32 and 46.

The first end 66 of the support plate 61 which extends outwardly from the first side 38 of the first beam 32 and the second opposed end 68 which extends outwardly from the second side 54 of the second beam 46 are each provided with a plurality of apertures 72 and 72', respectively. The first end 66 and the second opposed end 68 of support plate 61 serve as flanges for securing pintle hook support assembly 162 thereto.

Pintle hook support assembly 162, a reinforced structure formed of a plurality of plates fixably secured together, such as by welding, so as to have a configuration substantially as shown, includes an upper connecting side 168 having an upper connecting surface 170, a lower side 172, flange 174, a vertically disposed rearward side 176 having a rearward surface 166, a first end 178 and a second opposed end 180. Upper connecting side 168, flange 174 and vertically disposed rearward side 176 cooperate to form an acute angular relationship 182 between upper connecting side 168 and vertically disposed rearward side 176. The acute angular relationship 182 between upper connecting side 168 and vertically disposed rearward side 176 is such that when the upper connecting surface 170 of the upper connecting side 168 is abutted with the second opposed support surface 64 of support plate 61, and the upper connecting side 168, and thus pintle hook support assembly 162, is secured to support plate 61, the vertical plane of the rearward surface 166 of vertically disposed rearward side 176 of the pintle hook support assembly 162 is substantially perpendicular to the elongated axis of the first beam 32 and the second beam 46 of the support assembly 26.

Upper connecting side 168 of pintle hook support assembly 162 is provided with a plurality of apertures 184 and 184' in its opposed end portions which can be aligned with the apertures 72 and 72' in the first end 66 and the second opposed end 68, respectively, of the support plate 61. Thus, pintle hook support assembly 162 can be secured to the support plate 61 by abutting the second opposed support surface 64 of the support plate 61 with the upper connecting surface 170 of the upper connecting side 168 of the pintle hook support assembly 162, aligning the apertures 184 and 184' in the upper connecting side 168 of the pintle hook support assembly 162 with the apertures 72 and 72' in the first end 66 and the second opposed end 68 of the support plate 61, respectively, and positioning a plurality of bolts 186 and 186' in the aligned apertures 184 and 72, and 184' and 72', respectively. Bolts 186 and 186' are secured in place by nuts 188 and 188', respectively. The upper connecting side 168 of the pintle hook support assembly 162 is further provided within an enlarged opening 190 positioned so as to be alignable with the enlarged opening 70 in the support plate 61 so that upon securing the pintle hook support assembly 162 to the support assembly 26, one can readily have access to the hollow interior of the pintle hook support assembly 162 to facilitate connecting units, such as pintle hook assembly 164, to the rearward surface 166 of the vertically disposed rearward side 176 of the pintle hook support assembly 162.

The lower side 172 of the pintle hook support assembly 162 is also provided with an enlarged opening 192 (shown in phantom) to further increase the access to the interior of the pintle hook support assembly 162. Access to the interior of the pintle hook support assembly 162 facilitates the operator of the vehicle in securing the pintle hook assembly 164 to the rearward surface 166 of the vertically disposed rearward side 176 of the pintle hook support assembly 162.

The vertically disposed rearward side 176 of the pintle hook support assembly 162 is provided with a bore 194 positioned within the central portion thereof. A plurality of apertures 196 are likewise provided in the vertically disposed rearward side 176 of the pintle hook support assembly, the apertures 192 and the bore 190 cooperating in the attachment of the pintle hook assembly 164 to the vertically disposed rearward side 176 of the pintle hook support assembly.

Pintle hook assembly 164 includes a support plate 198 having a forward surface 200; an opposed rearward surface 202; a bore (not shown) positioned within the central portion of the support plate 198, and a plurality of apertures 204 positioned within the support plate 198; and a pintle hook 206 having a first end 208 forming the latch mechanism and a second opposed end 210 of a substantially cylindrical configuration which is provided with nut engaging threads 212 for engaging a nut 214. The pintle hook 206 is secured to the opposed rearward surface 202 of the support plate 198 so that the first end 208 forming the latch mechanism of the pintle hook 206 extends away from the opposed rearward surface 202 of the support plate 198 (as shown in the drawing) and the second opposed end 210 is positioned in and extends through the bore (not shown) of the support plate 198.

To attach the pintle hook assembly 164 to the vertically disposed rearward side 176 of the pintle hook support assembly 162, the forward surface 200 of the support plate 198 is abutted to the rearward surface 166 of the vertically disposed rearward side 176 of the pintle hook support assembly 162 so that the bore 194 receives the second opposed end 210 of the pintle hook 206 positioned in and extending through the bore (not shown) of the support plate 198 of the pintle hook assembly 164; and, the apertures 196 in the vertically disposed rearward side 176 of the pintle hook support assembly 162 are aligned with the apertures 204 in the support plate 198 of the pintle hook assembly 164. The pintle hook assembly 164 is thereafter secured to the vertically disposed rearward side 176 of the pintle hook support assembly 162 by securing nut 214 on the nut engaging threads 212 of the second opposed end 210 of the pintle hook 206 and by positioning a plurality of bolts 216 in the aligned apertures 196 and 204 of the vertically disposed rearward side 176 of the pintle hook support assembly 162 and of the support plate 198 of the pintle hook assembly 164, respectively, and securing the bolts 216 therein by nuts 218.

The unique angular relationship provided by the cooperation of the first beam 32, the second beam 46 and the support plate 61 with the block member 28 or with the pintle hook support assembly 162 readily allows the operator of the vehicle 10 to interchangably provide the vehicle 10 with a rear bumper, a push block, or a pintle hook. Such is accomplished, not only by the unique angular relationship created between the first beam 32, the second beam 46, the support plate 61 and the block member 28 or the pintle hook support assembly 162, but also by the unique structural characteristics of each.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. A reversible push block-rear bumper assembly for a wheeled vehicle which comprises:
   (a) support means secured to the underside of the vehicle in close proximity to the rear end portion of the vehicle, said support means having a forwardly inclined downwardly extending support surface;
   (b) block means having an upper end portion and a lower end portion maintained in a separate spatial relationship, said upper end portion having an inclined connecting surface for mating with the support surface of said support means so that in a first position said block means extends downwardly from said support means in a plane substantially perpendicular to the longitudinal axis of the vehicle and in a second position extends rearwardly from the rear end portion of the vehicle; and
   (c) first fastening means for detachably securing the inclined connecting surface of said block means to the support surface of said support means so that the block means is positioned in a selected one of the first and second positions.

2. The reversible push block-rear bumper assembly according to claim 1 which further includes a bumper member fixably secured to the lower end portion of said block means for providing an enlarged surface area for contact with a second vehicle's bumper when said block means is in the second position in which the block means is outwardly extending.

3. The reversible push block-rear bumper assembly according to claim 1 wherein said support means includes:
   a pair of longitudinally extending beams forming a portion of the longitudinal frame structure of the vehicle, said support beams being maintained in a spaced, parallel relationship, each of said support beams having their rearwardly extending end portion beveled to provide a forwardly inclined downwardly extending support surface which forms an acute angle with the longitudinal axis of said beams; and
   a support plate securely attached to the forwardly inclined downwardly extending support surfaces of said beams thereby providing an enlarged support surface having substantially the same angular relationship as the beveled end portions of said beams, said support plate being further provided with an enlarged, elongated opening therein intermediate the areas of contact between said support plate and said beams.

4. The reversible push block-rear bumper assembly according to claim 3 which further comprises:
   (a) an extension means having an upper end portion and a lower end portion, the upper and lower end portions being in a non-parallel spatial relationship, the upper end portion of said extension means having a forwardly inclined downwardly extending connecting surface for mating with the enlarged support surface of said support plate, said lower end portion of said extension means having a forwardly inclined downwardly extending support surface for mating with the inclined connecting surface of said block means, said first fastening means detachably securing the upper end portion of said extension means to said support plate; and
   (b) second fastening means for detachably securing the lower end portion of said extension means to the upper end portion of said block means so that in an assembled position the angular disposition and rearward extension length of said block means is substantially altered.

5. The reversible push block-rear bumper assembly according to claim 4 wherein said extension means is fabricated of a plurality of plate members and is further provided with a first enlarged, substantially centrally disposed opening in the upper end portion thereof, the centerally disposed opening of the extension means being alignable with the elongated opening in said support plate.

* * * * *